United States Patent
Cortes Gomez

(10) Patent No.: US 8,446,864 B2
(45) Date of Patent: May 21, 2013

(54) EPS CONNECTIVITY DURING OPERATOR DETERMINED BARRING

(75) Inventor: Francisco Cortes Gomez, Würselen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 208 days.

(21) Appl. No.: 13/058,871

(22) PCT Filed: Aug. 10, 2009

(86) PCT No.: PCT/IB2009/006498
§ 371 (c)(1), (2), (4) Date: Feb. 14, 2011

(87) PCT Pub. No.: WO2010/018439
PCT Pub. Date: Feb. 18, 2010

(65) Prior Publication Data
US 2011/0134851 A1    Jun. 9, 2011

Related U.S. Application Data

(60) Provisional application No. 61/088,403, filed on Aug. 13, 2008.

(51) Int. Cl.
*H04W 4/00* (2009.01)

(52) U.S. Cl.
USPC ........................................ 370/328; 455/422.1

(58) Field of Classification Search
None
See application file for complete search history.

(56) References Cited

U.S. PATENT DOCUMENTS

2005/0176438 A1* 8/2005 Li ................................ 455/450

FOREIGN PATENT DOCUMENTS

WO    Wo 2006/055986 A    5/2006

* cited by examiner

*Primary Examiner* — Clemence Han

(57) ABSTRACT

A node and method for handling barring of services in an Evolved Packet System (EPS) enabled network using an amended full Access Point Name (APN). The Fully Qualified Domain Name (FQDN) of the APN is amended to include an extension, which indicates that the corresponding APN is to be excluded from Operator Determined Barring (ODB).

9 Claims, 3 Drawing Sheets

EPS CONNECTIVITY DURING OPERATOR DETERMINED BARRING

CROSS-REFERENCE TO RELATED APPLICATIONS

This application claims the benefit of U.S. Provisional Application No. 61/088,403, filed Aug. 13, 2008, the disclosure of which is fully incorporated herein by reference.

TECHNICAL FIELD

The present invention relates to a solution for handling the barring of services in a telecommunications Evolved Packet System (EPS) network

BACKGROUND

3GPP based mobile telecommunication systems include the network feature Operator Determined Barring (ODB) that allows a network operator or service provider to regulate access by subscribers to services within the 3GPP system.

In releases previous to 3GPP release 8, the following barring categories apply to packet oriented services:
 1. Barring of all Packet Oriented Services;
 2. Barring of Packet Oriented Services from access points that are within the HPLMN whilst the subscriber is roaming in a VPLMN; and
 3. Barring of Packet Oriented Services from access points that are within the roamed to VPLMN.

3GPP System Architecture Working Group 1 (SA1) has confirmed that existing ODB barring categories for roaming and packet oriented services are also applicable for the Rel-8 EPS and that there is no plan to add further categories in Release 8. The problem is that in the new architecture introduced with release 8, the Evolved Packet System (EPS), packet oriented services are to be used to provide all types of services (although support for interworking with other services is partly supported to allow a better migration).

This means that applying the same packet oriented services barring categories from pre-Release 8 EPS has more severe impacts on EPS, up to the point of preventing basic connectivity services like those needed for some emergency related services (note that Earthquake and Tsunami Warning System (ETWS) is not prevented due to a different implementation).

Therefore, the existing barring categories for packet oriented services which were appropriate for Pre-Release 8, where circuit oriented services were also available, are not that appropriate for Release-8 EPS.

SA1 has clarified to CT4 that applying existing ODB Barring Categories in Release 8 EPS for packet oriented services only allows implementing all-or-nothing barring for services, but that doesn't mean that connectivity is lost. SA1 thus assumes it is possible to bar a User Equipment (UE) from accessing the Internet over IP while still allowing connectivity to the UE. However, barring internet access requires barring packet oriented services, and barring packet oriented services would as a consequence also deny all connectivity to the UE.

This reflects the fact that adding new categories at this stage is almost impossible (release freeze for December 2008, and ODB categories belong to stage 1 work), but it is possible to agree on a slightly different handling in EPS, by allowing differentiation between "commercial services" to be barred, and "emergency" or "basic connectivity" services to be allowed.

As 3GPP working groups did not realize problem until a short time ago only one solution has been described up to now. In [ODB CR], a proposal is made for excluding APNs from ODB, by provisioning a list of excluded APNs in the HSS and providing it to the MME together with the ODB information.

There are several problems with this particular solution:
 1. It has impacts on the HSS implementation and in the amount of storage needed per UE and
 2. It impacts the S6a interface towards the Mobility Management Entity (MME).

It would be advantageous to have a system and method for providing Operator Determined Barring that overcomes the disadvantages of the prior art. The present invention provides such a system and method.

SUMMARY

It is an object of the present invention to remedy at least some of the problems by providing a device that provides a low cost and standardized solution for excluding communication from barring services.

The present invention provides means for excluding certain Access Point Names (APNs) from Operator Determined Barring. Instead of requiring the provisioning of a list of excluded APNs in the HSS and providing it via S6a, this invention proposes the use of a specific syntax for a Fully Qualified Domain Name (FQDN) used for emergency/basis-connectivity APNs.

According to [DNS TS], the FQDN of an APN is of the form:
 <APN-NI>.apn.epc.mnc<MNC>.mcc<MCC>.3gppnetwork.org The present invention uses a different syntax for emergency/basis-connectivity APNs, of the form:
 <APN-NI>.eapn.epc.mnc<MNC>.mcc<MCC>.3gppnetwork.org In this way, an MME always knows if a PDN-connection shall be excluded from ODB or not, without the need for special provisioning or signaling towards any other node. At the same time, a number of such APNs can be utilized, as no restriction is put on the <APN-NI> part.

BRIEF DESCRIPTION OF THE DRAWINGS

In the following section, the invention will be described with reference to exemplary embodiments illustrated in the figures, in which.

DETAILED DESCRIPTION

Figure 1:
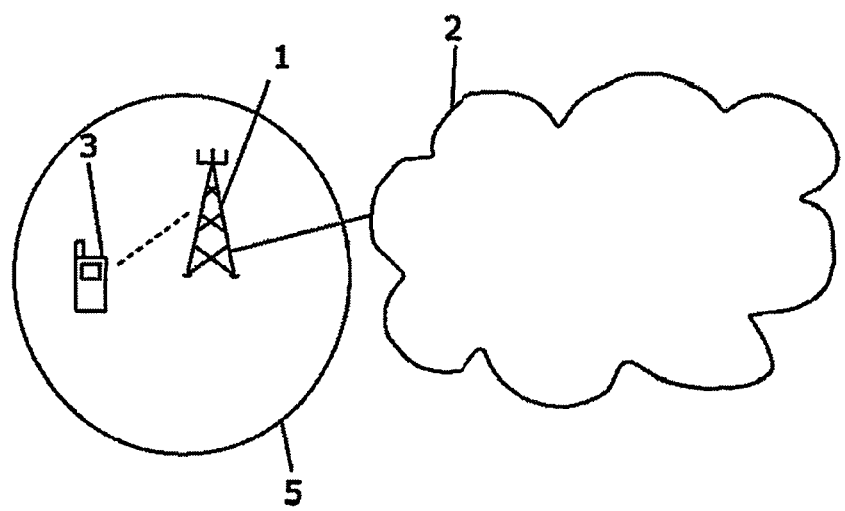
FIG. 1 illustrates schematically an example of a network configuration in an embodiment of the present invention.

In FIG. 1 an infrastructure device such as a base station system is shown in an example of a network configuration, wherein base station 1 or similar wireless network access gateway (e.g. access point, NodeB, eNodeB, and so on) is in communication with infrastructure communication network 2. Base station 1 is arranged to communicate wirelessly with user equipment 3 within communication range cell 5. Base station 1 may further comprise a plurality of antennas.

Figure 2:
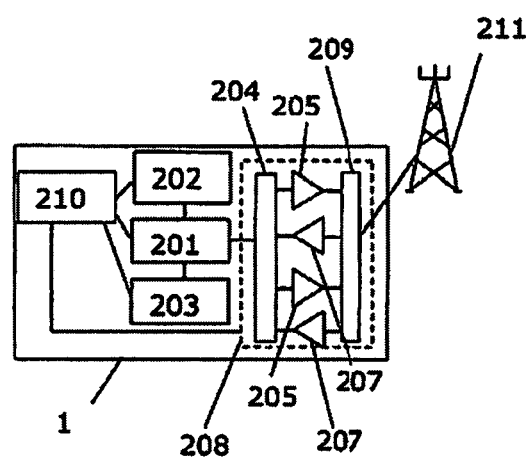
FIG. 2 illustrates schematically a device in an embodiment of the present invention.

In FIG. 2 a device 1 (e.g. a base station) implementing the solution according to an embodiment of the present invention is shown. The device may comprise processing unit 201, memory unit 202, and communication interface 203. Furthermore, the device comprises transceiver portion 208 for receiving and transmitting radio signals via antenna configuration 211. The transceiver portion may comprise AD/DA unit(s) 204, transmitter power amplifier 205, receiver power amplifier 207, and optionally switch/multiplexer 209. The processing unit is arranged to run code for communication control and data traffic. It is further arranged to determine which antennas to use in a MIMO communication configuration. The processing unit 201 may comprise a microprocessor, a Digital Signal Processor (DSP), an ASIC (Application Specific Integrated Circuit), or an FPGA (Field programmable gate array). Memory unit 202 may comprise any suitable type of memory or combination thereof (volatile and/or non-volatile), e.g., RAM, ROM, EEPROM, Flash, and hard disk. Communication interface 203 connects device 1 to infrastructure network 2. It should be understood by the skilled person that other communication equipment may be present as well depending on the type of wireless communication protocol/standard used; however at least one power supply module 210 is used to provide electrical power to base station 1.

It should be noted that transceiver portion 208 may be configured in different ways depending on radio technology and/or communication protocol used as understood by the skilled person.

In a similar manner a UE may comprise a processing unit, a memory unit, a user interface (e.g. a display and keyboard), and at least one wireless communication interface for communication with the base station 1. The UE may comprise other units as well depending on configuration, e.g. with a Bluetooth communication interface, SIM card holder, battery, and so on. The different units may operate in a similar manner as for the base station 1, e.g. operating software instructions, the processing unit being of similar types as mentioned for the base station and so on.

According to [DNS TS], the fully qualified domain name (FQDN) of an Access Point Name (APN) is of the form:
<APN-NI>.apn.epc.mnc<MNC>.mcc<MCC>.3gppnetwork.org
Where:
<APN-NI> Is the APN Network Identifier;
"apn" Is a single label used as subdomain "cut" indicating that the FQDN identifies an APN;
"epc" Is a single label used as subdomain "cut" indicated that the FQDN identifies an item related to the Evolved Packet Core; and
"mnc<MNC> . . . " Identifies the operator network where this APN is to be served Mobile Network Code (MNC) is used in combination with a Mobile Country Code (MCC) (also known as a "MCC/MNC tuple") to uniquely identify a mobile phone operator/carrier using for instance GSM, CDMA, WCDMA, and UMTS public land mobile networks.

In the present invention an additional label is defined, e.g., "eapn" or "eapn functionality" (i.e. the network shall understand from the full APN that the UE shall be excluded from barring services in the network), which is used in the same way as "apn", but which identifies the corresponding APN as excluded from ODB:
<APN-NI>.eapn.epc.mnc<MNC>.mcc<MCC>.3gppnetwork.org It should be appreciated that the string ".3gppnetwork.org" is used only as an example and does not limit the invention to this string. It should also be noted that the additional label may be solved by amending the apn label to reflect the functionality according to the present invention.

In this way, an MME always knows if a PDN-connection shall be excluded from ODB or not, without the need for special provisioning or signalling towards any other node. At the same time, a number of such APNs may be utilized, as no restriction is put on the <APN-NI> part. The MME or some other network infrastructure node may receive the APN, extract the eapn label, and use this information for excluding the PDN connection from ODB.

When executing packet oriented services related ODB procedures [see sections 2.5A; (Barring of UE requested PDN connectivity shall be performed based on the Operator Determined Barring for Packet Oriented Services defined in 3G TS 22.041); 2.6A (Barring of existing PDP contexts shall be performed based on the Operator Determined Barring for Packet Oriented Services defined in 3G TS 22.041) and 2.6B (Barring of existing EPS Bearer contexts shall be performed based on the Operator Determined Barring for Packet Oriented Services defined in 3G TS 22.041) of [ODB TS])]; the MME shall check if the APN of the affected PDN-Connection uses the "eapn" label, and if so, exclude it from barring.

For such APNs, we also propose to mandate that the UE always uses the full APN, including the "eapn.epc". Note that 3GPP also allows the UE to only send the <APN-NI> part for PDP context activation (and will probably do the same for EPS bearers/PDN-connection).

It would be possible to avoid the previous restriction of mandating the usage of full APNs by the UE, but it helps to reduce the complexity of the DNS procedures and no need is seen for the flexibility of <APN-NI> only usage by the UE.

Figure 3:
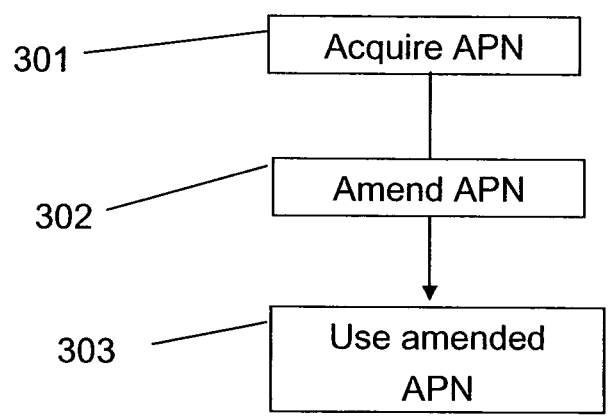
FIG. 3 illustrates in a schematic view a method in an embodiment of the present invention.

FIG. 3 illustrates a method for adding the eapn functionality to the full APN in an embodiment of the present invention. The process begins with step 301 that depicts acquiring a full Access Point Name (APN). Next the process continues in step 302 where the full APN is amended to include the eapn label functionality, which may be accomplished by amending the apn label with an eapn label to the epc or amending the apn.epc label to include an eapn label (e.g., eapn.apn.epc label). The process then moves to step 303 where the fully amended APN is used in PDP connection communications.

It should be noted that this embodiment does not provide a full solution for the requirement of allowing emergency/basis connectivity in EPS during ODB. There is still the need to limit the usage of the excluded APNs to only emergency/basis connectivity and preventing other services. This is something that can easily be done with procedures such as:
 Use of the PCC architecture
 Using a packet data network to serve the excluded APN that does not allow any other service by either restricting the connectivity to the private network where no other servers are available, or other IP-based means like the use of firewalls, access lists, and so on.

Since these additional procedures are well-known, they are not described further.

ABBREVIATIONS

APN Access Point Name
CN Core Network
EPS Evolved Packet System
ETWS Earthquake and Tsunami Warning System
HPLMN Home Public Land Mobile Network
MME Mobility Management Entity
MS Mobile Station
ODB Operator Determined Barring
SAE System Architecture Evolution SA1 3GPP System Architecture Working Group 1
SGSN Serving GPRS Support Node
TA Tracking Area
UE User Equipment
VPLMN Visited Public Land Mobile Network As will be recognized by those skilled in the art, the innovative concepts described in the present application can be modified and varied over a wide range of applications. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a telecommunication network, of excluding an Access Point Name, APN, from Operator Determined Barring, ODB, the method comprising:
   acquiring an APN;
   amending the APN to include an indicator that the APN is to be excluded from ODB in the network, wherein the amending step includes amending an element of a Fully Qualified Domain Name (FQDN) of the APN, the element indicating that the FQDN identifies an APN, and wherein the indicator is a prefix added to the element to indicate the APN shall be excluded from ODB; and
   utilizing the amended APN in Packet Data Protocol, PDP, connection communications.

2. The method of claim 1, wherein the telecommunication network is 3GPP system architecture Release-8, Evolved Packet System, EPS.

3. The method of claim 1, wherein the amending step includes amending the FQDN of the APN into the form:
   <APN-NI>.eapn.epc.mnc<MNC>.mcc<MCC>.3gppnetwork.org
   where:
   <APN-NI> is an APN Network Identifier;
   eapn is a single label used as a subdomain cut indicating that the FQDN identifies an APN, wherein the prefix (e) indicates that the APN shall be excluded from ODB;
   epc is a single label used as a subdomain cut indicated that the FQDN identifies an item related to the Evolved Packet Core;
   mnc<MNC> is a Mobile Network Code (MNC) that identifies the operator network where this APN is to be served; and
   mcc<MCC> is a Mobile Country Code (MCC) used in combination with the MNC to uniquely identify a mobile phone operator/carrier.

4. A node in a telecommunication network for excluding an Access Point Name, APN, from Operator Determined Barring, ODB, the node comprising:
   a mobility management device, MMD, comprising a transceiver, a processor, and a memory, wherein when the processor executes computer program instructions stored on the memory, the processor causes the MMD to acquire a particular APN for amendment, and to alter the particular APN by amending the particular APN's network address to indicate the particular APN is to be excluded from ODB in the network, wherein the APN's network address is amended by amending an element of a Fully Qualified Domain Name (FQDN) of the APN, the element indicating that the FQDN identifies an APN, and wherein the indicator is a prefix added to the element to indicate the APN shall be excluded from ODB; and
   means for utilizing the amended APN in Packet Data Protocol, PDP, connection communications.

5. The node of claim 4, wherein the telecommunication network is 3GPP system architecture Release-8, Evolved Packet System, EPS.

6. The node of claim 4, wherein the MMD alters the APN so that the FQDN of the APN is amended into the form:
   <APN-NI>.eapn.epc.mnc<MNC>.mcc<MCC>.3gppnetwork.org
   where:
   <APN-NI> is an APN Network Identifier;
   eapn is a single label used as a subdomain cut indicating that the FQDN identifies an APN, wherein the prefix (e) indicates that the APN shall be excluded from ODB;
   epc is a single label used as a subdomain cut indicated that the FQDN identifies an item related to the Evolved Packet Core;
   mnc<MNC> is a Mobile Network Code (MNC) that identifies the operator network where this APN is to be served; and
   mcc<MCC> is a Mobile Country Code (MCC) used in combination with the MNC to uniquely identify a mobile phone operator/carrier.

7. An Operator Determined Barring (ODB) system in a telecommunication network, the system comprising:
   a transceiver for receiving a request for service via an Access Point Name, APN, wherein the APN is an amended APN;
   processor means for detecting that the amended APN includes an indicator that indicates the amended APN is excluded from ODB in the telecommunication network, wherein the APN is amended by amending an element of a Fully Qualified Domain Name (FQDN) of the APN, the element indicating that the FQDN identifies an APN, and wherein the indicator is a prefix added to the element to indicate the APN shall be excluded from ODB; and
   means for allowing the amended APN to be used in Packet Data Protocol, PDP, connection communications.

8. The node of claim 7, wherein the telecommunication network is 3GPP system architecture Release-8, Evolved Packet System, EPS.

9. The system of claim 7, wherein the processor means is configured to detect that the FQDN is amended into the form:
   <APN-NI>.eapn.epc.mnc<MNC>.mcc<MCC>.3gppnetwork.org
   where:
   <APN-NI> is an APN Network Identifier;
   eapn is a single label used as a subdomain cut indicating that the FQDN identifies an APN, wherein the prefix (e) indicates that the APN shall be excluded from ODB;
   epc is a single label used as a subdomain cut indicated that the FQDN identifies an item related to the Evolved Packet Core;
   mnc<MNC> is a Mobile Network Code (MNC) that identifies the operator network where this APN is to be served; and
   mcc<MCC> is a Mobile Country Code (MCC) used in combination with the MNC to uniquely identify a mobile phone operator/carrier.

* * * * *